(12) United States Patent
Mossoba et al.

(10) Patent No.: US 12,175,318 B2
(45) Date of Patent: *Dec. 24, 2024

(54) TRANSACTION CARD INCLUDING EXPANDED IDENTIFICATION CHIP

(71) Applicant: Capital One Services, LLC, McLean, VA (US)

(72) Inventors: Michael Mossoba, Arlington, VA (US); Kevin Osborn, Newton, MA (US); Bryant Yee, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,426

(22) Filed: May 30, 2023

(65) Prior Publication Data

US 2023/0306231 A1   Sep. 28, 2023

Related U.S. Application Data

(63) Continuation of application No. 17/526,291, filed on Nov. 15, 2021, now Pat. No. 11,699,060.

(51) Int. Cl.
*G06K 19/06* (2006.01)
*G06K 19/077* (2006.01)

(52) U.S. Cl.
CPC . *G06K 19/07743* (2013.01); *G06K 19/07722* (2013.01)

(58) Field of Classification Search
CPC ....... G06K 19/07743; G06K 19/07722; G06K 19/07749; G06K 19/07; G06K 19/077; G06Q 30/341; G06Q 20/352

USPC ......................................... 235/492, 487, 486
See application file for complete search history.

(56) References Cited

U.S. PATENT DOCUMENTS

| | | | | |
|---|---|---|---|---|
| 11,157,790 B1* | 10/2021 | Santos | ............ | G06K 19/07745 |
| 11,699,060 B2* | 7/2023 | Mossoba | .......... | G06K 19/07769 |
| | | | | 235/492 |
| 2012/0235958 A1* | 9/2012 | Chen | ........................ | G09G 3/20 |
| | | | | 345/204 |
| 2014/0361086 A1* | 12/2014 | Finn | ..................... | B23K 26/362 |
| | | | | 235/492 |
| 2015/0178616 A1* | 6/2015 | Blum | ................ | G06K 19/07722 |
| | | | | 235/488 |
| 2016/0104065 A1* | 4/2016 | Tsukada | ........... | G06K 19/07794 |
| | | | | 235/492 |
| 2016/0307088 A1* | 10/2016 | Wurmfeld | ........ | G06K 19/07722 |
| 2016/0364638 A1* | 12/2016 | Ward | ................. | G06K 19/0772 |
| 2020/0256339 A1* | 8/2020 | Stuart | ................... | F04D 29/026 |

* cited by examiner

*Primary Examiner* — Daniel St Cyr
(74) *Attorney, Agent, or Firm* — KDW Firm PLLC

(57) ABSTRACT

Provided are transaction cards including an expanded identification ship. In some approaches, a transaction card may include a body having a first main side opposite a second main side, wherein the body defines an outer perimeter including a first end perimeter opposite a second end perimeter, and a first side perimeter opposite a second side perimeter. The transaction card may further include an identification chip having a plurality of contacts, wherein a first contact of the plurality of contacts extends to at least one of the following: the first end perimeter, the second end perimeter, the first side perimeter, and the second side perimeter.

20 Claims, 9 Drawing Sheets

TRANSACTION CARD INCLUDING EXPANDED IDENTIFICATION CHIP

CROSS-REFERENCE TO RELATED APPLICATIONS

This application is a continuation of U.S. patent application Ser. No. 17/526,291, entitled "TRANSACTION CARD INCLUDING EXPANDED IDENTIFICATION CHIP" filed Nov. 15, 2021. The contents of the aforementioned application are incorporated herein by reference in their entirety.

FIELD

Embodiments of the present disclosure relate to transaction cards and, more particularly, to transaction cards with an expanded identification chip.

BACKGROUND

Transaction cards, such as credit and debit cards, are one of the primary means for individuals to complete transactions involving data exchange. Many other forms of cards are also widely used, such as identification cards, loyalty cards, prescription cards, insurance cards, etc. With the increasing use of transaction cards by individuals, the market for different types of transaction cards continues to grow. Card issuers may wish to provide a premium physical card to differentiate such cards from traditional transaction cards. It is with respect to this and other considerations that the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a transaction card may include a body having a first main side opposite a second main side, wherein the body defines an outer perimeter including a first end perimeter opposite a second end perimeter, and a first side perimeter opposite a second side perimeter. The transaction card may further include an identification chip comprising a plurality of contacts, wherein a first contact of the plurality of contacts extends to at least one of the following: the first end perimeter, the second end perimeter, the first side perimeter, and the second side perimeter.

In another approach according to the disclosure, a transaction card may include a body having a first main side opposite a second main side, wherein the body defines an outer perimeter including a first end perimeter opposite a second end perimeter, and a first side perimeter opposite a second side perimeter. The transaction card may further include an identification chip along the first main side, the identification chip comprising a plurality of contacts, wherein a first contact of the plurality of contacts extends along the first main side to at least one of the following: the first end perimeter, the second end perimeter, the first side perimeter, and the second side perimeter.

In yet another approach according to the disclosure, a transaction card may include a body having a first main side opposite a second main side, wherein the body defines an outer perimeter including a first end perimeter opposite a second end perimeter and a first side perimeter opposite a second side perimeter. The transaction card may further include an identification chip comprising a plurality of contacts, wherein the identification chip is part of the first main side, and wherein a first contact of the plurality of contacts extends to at least one of the following: the first end perimeter, the second end perimeter, the first side perimeter, and the second side perimeter.

BRIEF DESCRIPTION OF THE DRAWINGS

The accompanying drawings illustrate example approaches of the disclosure, including the practical application of the principles thereof, as follows.

Figure 1:
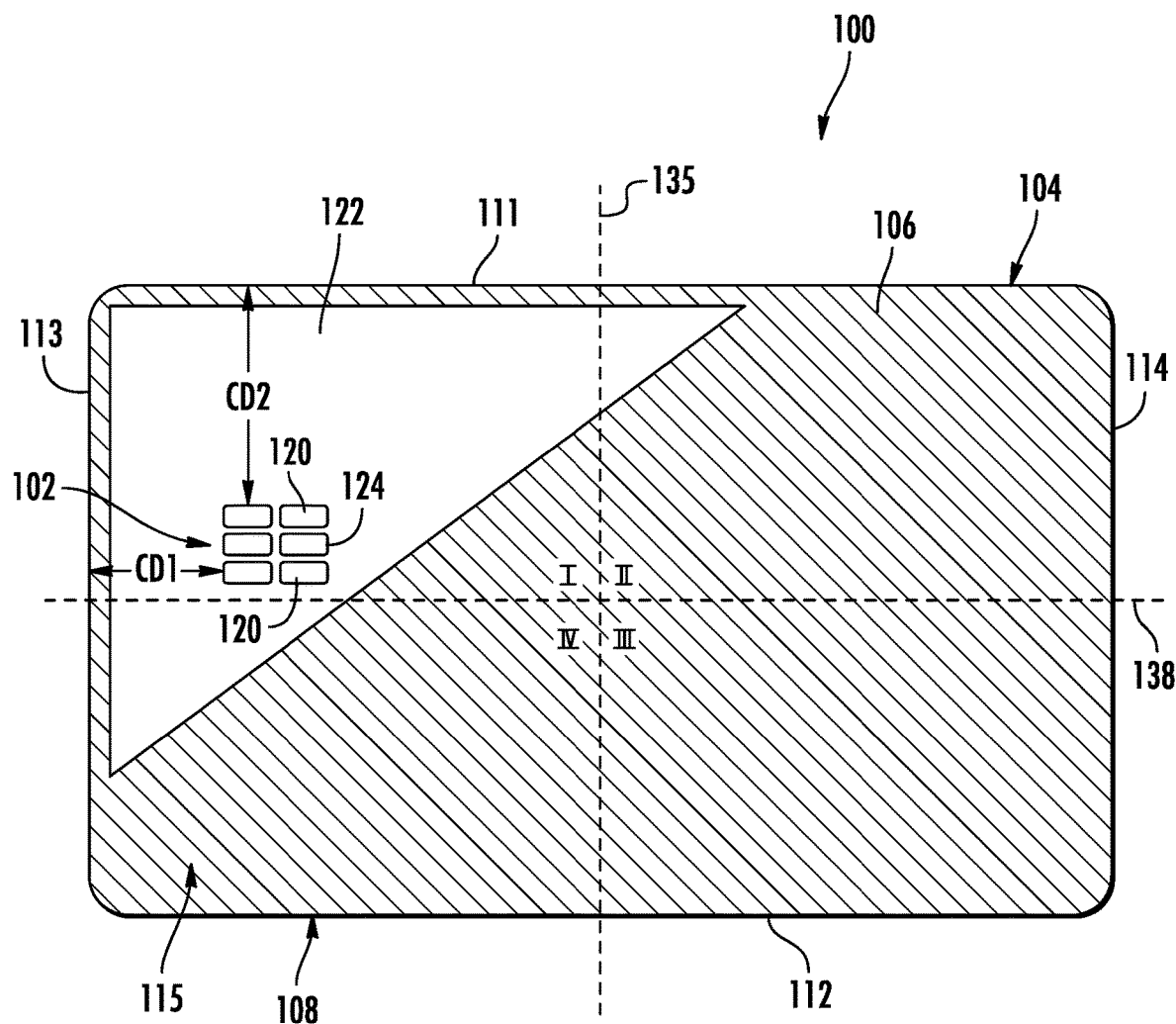
FIG. 1 is a top view of a transaction card in accordance with embodiments of the present disclosure.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Transaction cards of the present disclosure may include expanded identification chips, which provide both functional and aesthetic advantages. In some embodiments, the identification chips may include a plurality of contacts, wherein one or more of the plurality of contacts extends to a perimeter of the transaction card. In other embodiments in which the transaction card is virtually partitioned into quadrants by intersecting first and second axes, one or more of the plurality of contacts may extend across the first axis and/or the second axis.

Referring now to FIG. 1, an example transaction card (hereinafter "card") 100 according to embodiments of the disclosure will be described. Transaction cards include, but are not limited to, credit cards, debit cards, gift cards, frequent flyer cards, merchant-specific cards, rewards cards, travel cards (e.g., a train pass, a bus pass, etc.), discount cards, insurance cards, identification cards, and driver's licenses. Described sometimes herein as contactless due to the method of communication by an identification (ID) chip 102, such as an EMV chip, the card 100 may also provide one or more functions requiring contact. For example, the card 100 may include a magnetic stripe and/or a microchip connected to contacts present on an outer (e.g., back) layer of the card 100.

The card 100 may be made from one or more thermoplastics including, but not limited to, polyvinyl chloride (PVC), polyester, polypropylene, polyethylene, or polycarbonate. Various other materials may also be used, including, but not limited to, soft touch plastic, metal (e.g., aluminum), fiber composite materials, resin, etc. In some embodiments, the card 100 may include additional material features, such as coverings (e.g., a silicone overmold), veneers (e.g., a wooden veneer), finishes (e.g. an oil-slick aluminum finish), or the like. In embodiments where a body 104 of the card 100 is formed of multiple layers or card substrates, each card substrate may be formed of the same material. Alternatively, one or more card substrates may be formed of a different material.

As shown, the body 104 of the card 100 may include a first main side 106 opposite a second main side. Although non-limiting, the first main side 106 may correspond to a front or top side of the card 100, while the second main side may correspond to a back or bottom side of the card 100. The body 104 may be defined by an outer perimeter 108 including a first side perimeter 111 opposite a second side perimeter 112, and a first end perimeter 113 opposite a second end perimeter 114. The first end perimeter 113 may correspond to an insertion end of the card 100. In other embodiments, the second end perimeter 114 may be the insertion end of the card 100.

The body 104 may include four quadrants (I-IV) defined by a first axis 135 and a second axis 138. The first axis 135 may extend between the first side perimeter 111 and the second side perimeter 112, while the second axis 138 may extend between the first end perimeter 113 and the second end perimeter 114. As shown, the first axis 135 and the second axis 138 are substantially perpendicular to one another. Quadrants I and II may define an upper, or first, section of the body 104, while quadrants III and IV may define a lower, or second, section of the body 104.

Although not shown, in some embodiments, the magnetic stripe may be provided on the second main side of the body 104, wherein the magnetic stripe is part of an outer layer of the body. In other embodiments, the magnetic stripe is part of a separate component or layer disposed atop or beneath the outer layer. The magnetic stripe may extend across the first axis 135, between the first end perimeter 113 and the second end perimeter 114. The magnetic stripe may contain cardholder data in accordance with standard protocols. of valid data in such a situation. Embodiments herein are not limited in this context.

Although not shown, the second main side of the card 100 may include additional identifying indicia. For example, additional identifying indicia may include a card verification value (CVV), such as a 3-digit number. Depending on the type of card, the additional identifying indicia may be present on or near a signature strip. The first main side 106 of the card 100 may also include identifying indicia, such as an account holder name and/or a card number. Although non-limiting, the card number may be a 16-digit number (e.g., four groups of four digits). In other embodiments, the card number may include a different number of digits. The identifying indicia may be printed over/on an outer layer of the body 104. However, one skilled in the art will appreciate that the printing of the identifying indicia, along with any other indicia, logos, etc., may be applied to any surface or layer of the card 100. Moreover, any suitable printing, scoring, imprinting, marking or like method is within the scope of the present disclosure.

The ID chip 102 may be formed in an outer layer 115 of the first main side 106 of the card 100. More specifically, a plurality of contacts 120 of the ID chip 102 may be formed on a plate 122, which is part of the outer layer 115, and connected on a layer (not shown) beneath the ID chip 102. In other embodiments, the plate 122 may be formed atop the outer layer 115, for example, by printing. Although non-limiting the plate 122 may be a metal layer, while the remainder of the body 104 may be a thermoplastic. Each of the plurality of contacts 120 may be electrically isolated from one another by a variety of different means, such as a non-conductive area, element, or liner 124.

As shown, the plate 122 may generally extend between the first end perimeter 113 and the first side perimeter 111. For example, the plate 122 may be triangular, extending across both the first axis 135 and the second axis 138. Said another way, the plate 122 may be present within quadrants I, II, and IV. In other embodiments, the plate 122 may be inverted such that the plate 122 is primarily present within quadrant IV. In the embodiment shown, the contacts 120 of the ID chip 102 are located within quadrant I.

In some embodiments, the ID chip 102 may be located only within quadrant I. In other embodiments, the ID chip 102 may overlap the first axis 135 and/or the second axis 138. Furthermore, the ID chip 102 may be positioned a first predefined distance 'CD1' from the first end perimeter 113 and a second predefined distance 'CD2' from the first side perimeter 111. To enable the ID chip 102 of the card 100 to operate normally with existing chip reading devices (e.g., ATMs, kiosks, point-of-sale machines, etc.), CD1 and/or CD2 may be selected to comply with one or more standards, such as ISO/IEC 7816. In some embodiments, the ID chip 102 overlaps the magnetic stripe and is closer to the first end perimeter 113 than to the second end perimeter 114. Said differently, a projection of the ID chip 102, extending through the body 104 between the first main side 106 and the second main side, may partially intersect or overlap the magnetic stripe.

As used herein, the ID chip 102 may be any microprocessor device configured to exchange data electromagnetically, such as an EMV or RFID chip. The RFID chip may include a radio frequency inductor, volatile or non-volatile memory storage, a microprocessor, circuitry logic, and/or an antenna. While in some embodiments electromagnetic data communications from the RFID chip will take place at radio frequencies, other embodiments may exchange electromagnetic data at different frequencies.

Figure 2:
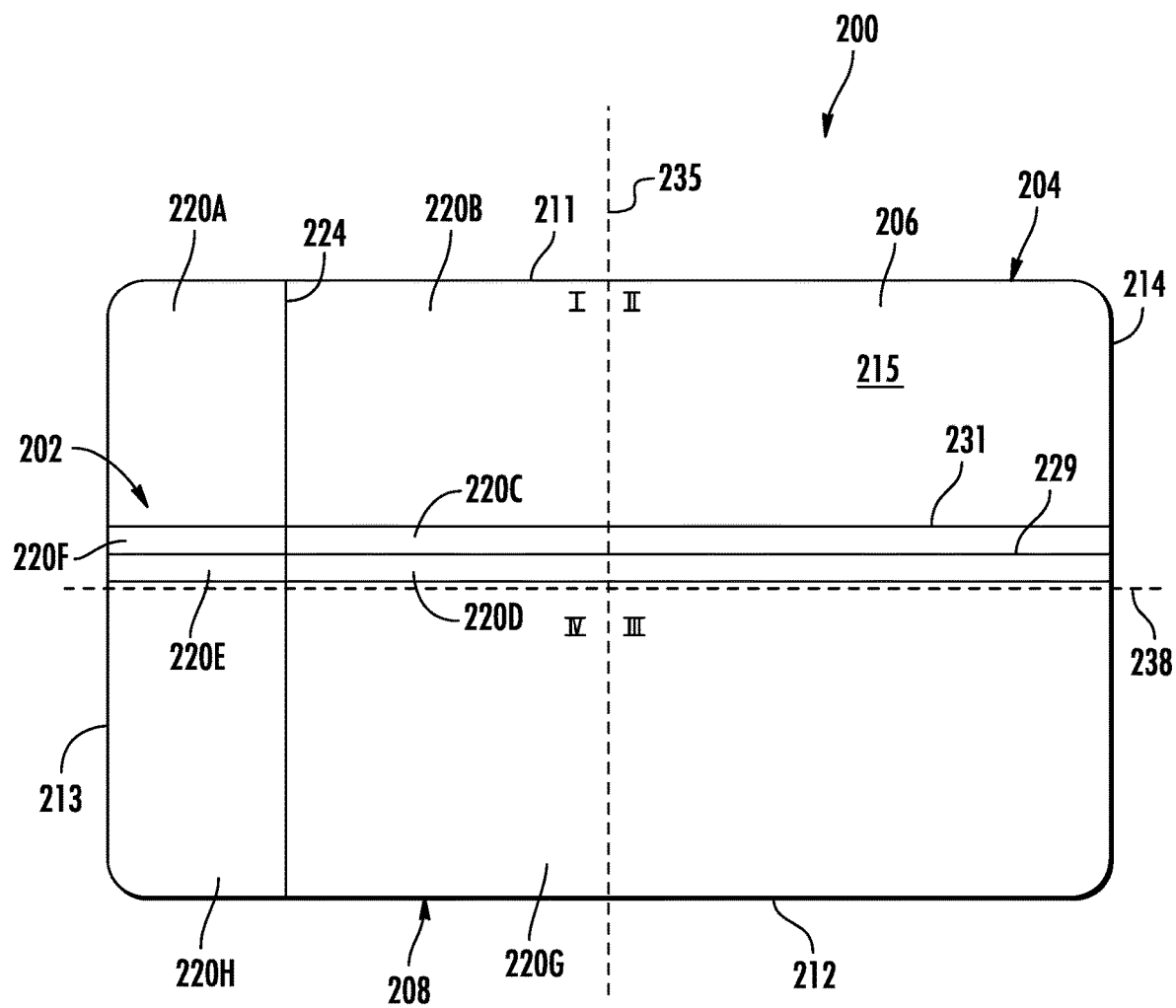
FIG. 2 is a top view of a transaction card in accordance with embodiments of the present disclosure.

Referring to FIG. 2, an example transaction card (hereinafter "card") 200 according to embodiments of the disclosure will be described. In the card 200 shown, an outer layer 215 of a body 204 of the card 200 may be made from one or more layers of metal. The body 204 of the card 200 may include a first main side 206 opposite a second main side. Although non-limiting, the first main side 206 may correspond to a front or top side of the card 200, while the second main side may correspond to a back or bottom side of the card 200. The body 204 may be defined by an outer perimeter 208 including a first side perimeter 211 opposite a second side perimeter 212, and a first end perimeter 213 opposite a second end perimeter 214. The first end perimeter 213 may correspond to an insertion end of the card 200. In other embodiments, the second end perimeter 214 may be the insertion end of the card 200.

The body 204 may include four quadrants (I-IV) defined by a first axis 235 and a second axis 238. The first axis 235 may extend between the first side perimeter 211 and the second side perimeter 212, while the second axis 238 may extend between the first end perimeter 213 and the second end perimeter 214. As shown, the first axis 235 and the second axis 238 are substantially perpendicular to one another. Quadrants I and II may define an upper, or first, section of the body 204, while quadrants III and IV may define a lower, or second, section of the body 204.

An ID chip 202 may be formed in the outer layer 215 of the first main side 206 of the card 200. In other embodiments, the ID chip 202 may be formed along the second main side of the card 200. As shown, a plurality of contacts 220A-220H of the ID chip 202 may extend along the first main side 206 of the body 204. Although non-limiting, the ID chip 202 may include six contacts (220A-220F) or eight contacts (220A-220H) in various embodiments. As shown, a first contact 220A of the plurality of contacts may extend entirely to the first side perimeter 211 and to the first end perimeter 213. A second contact 220B of the plurality of contacts may extend to the first side perimeter 211 and to the second end perimeter 214. As shown, the second contact 220B is electrically separated from the first contact 220A by a first non-conductive border or liner 224, which may extend between the first side perimeter 211 and the second side perimeter 212. Third and fourth contacts 220C, 220D may extend only to the second end perimeter 214, while fifth and sixth contacts 220E, 220F may only extend to the first end perimeter 213. The third and fourth contacts 220C, 220D may be separated from one another by a second non-conductive border or liner 229, which may extend between the first end perimeter 213 and the second end perimeter 214. Similarly, the fifth and sixth contacts 220E, 220F may be separated from one another by the second non-conductive liner 229. The second contact 220B may be separated from the third contact 220C, and the first contact 220A may be separated from the sixth contact 220F, by a third non-conductive liner 231. Finally, the first, fifth, and sixth contacts 220A, 220E, 220F may be separated from the second, third, and fourth contacts 220B, 220, 220D by the first non-conductive liner 224. When present, seventh contact 220G may extend to the second side perimeter 212, while eighth contact 220H may extend to both the first end perimeter 213 and to the second side perimeter 212.

Although non-limiting, contacts 220A-220F may be generally present within quadrants I. and II. In some embodiments, all of the contacts of the ID chip 202 may be present within quadrant I. Furthermore, the second, third, and fourth contacts 220B, 220C, 220D may be positioned a first predefined distance from the first end perimeter 213 and a second predefined distance from the first side perimeter 211 to enable the ID chip 202 of the card 200 to operate normally with existing chip reading devices (e.g., ATMs, kiosks, point-of-sale machines, etc.). However, by extending certain of the plurality of contacts 220A-220H to one or more edges defining the outer perimeter 208, the card 200 may also be read by non-conventional chip readers.

Figure 3:
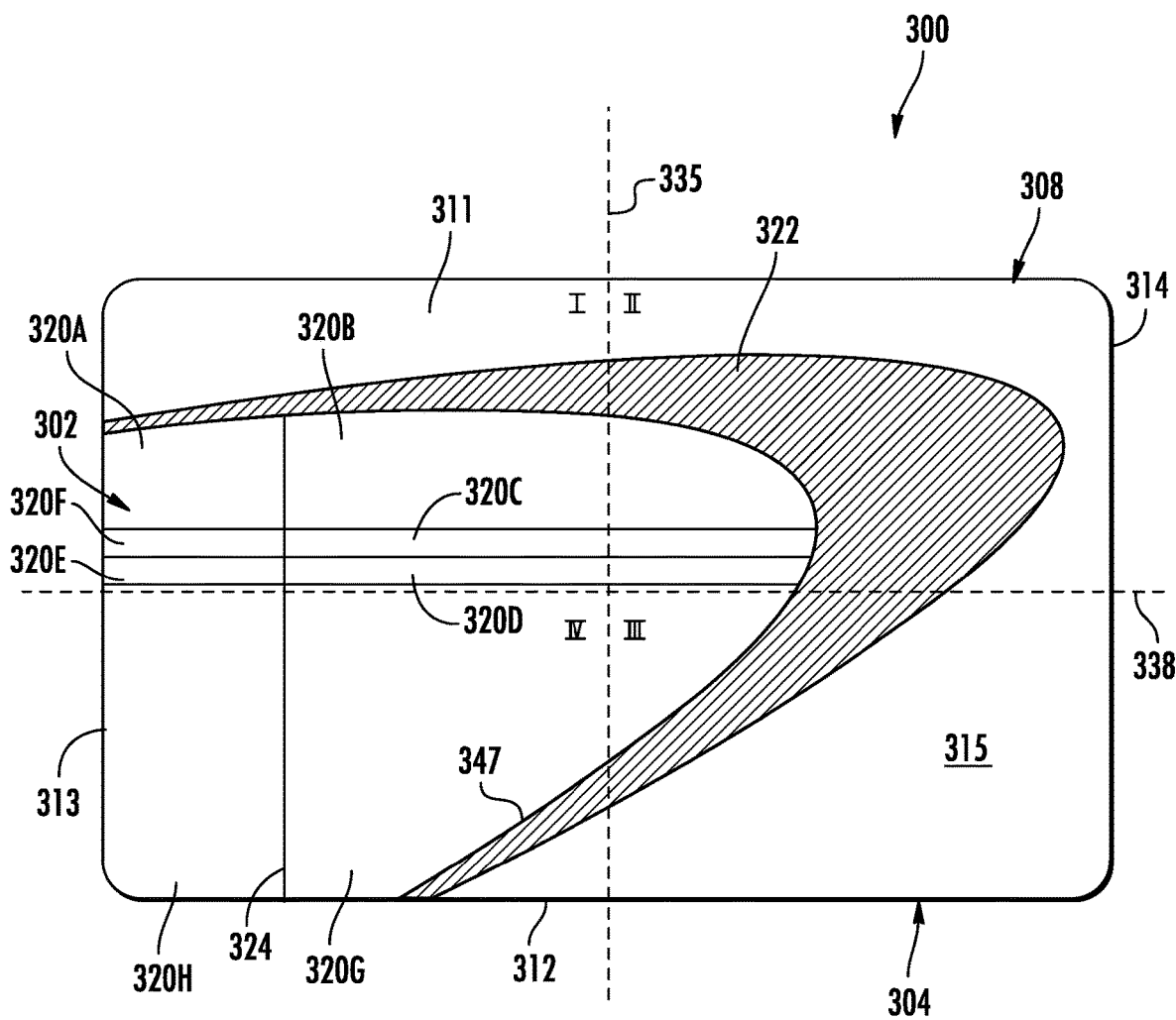
FIG. 3 is a top view of a transaction card in accordance with embodiments of the present disclosure.

Referring now to FIG. 3, an example transaction card (hereinafter "card") 300 according to embodiments of the disclosure will be described. In the card 300 shown, an outer layer 315 of a body 304 of the card 300 may be made from one or more layers of metal. The body 304 of the card 300 may include a first main side 306 opposite a second main side. Although non-limiting, the first main side 306 may correspond to a front or top side of the card 300, while the second main side may correspond to a back or bottom side of the card 300. The body 304 may be defined by an outer perimeter 308 including a first side perimeter 311 opposite a second side perimeter 312, and a first end perimeter 313 opposite a second end perimeter 314. The first end perimeter 313 may correspond to an insertion end of the card 300. In other embodiments, the second end perimeter 314 may be the insertion end of the card 300.

The body 304 may include four quadrants (I-IV) defined by a first axis 335 and a second axis 338. A metal plate 322 along the first main side 306 of the body 304 may extend across the first axis 335 and the second axis 338. The metal plate 322 may be part of the outer layer 315, and connected on a layer (not shown) beneath an ID chip 302. In other embodiments, the metal plate 322 may be formed atop the outer layer 315, for example, by printing. Although non-limiting, the metal plate 322 may be a first metal layer, while the remainder of the body 304 may be a second metal layer. As shown, the plate 322 may extend between the first end perimeter 113 and the second side perimeter 312. For example, the plate 322 may be a design or logo present within quadrants one or more of quadrants I-IV. In some embodiments, the plate 322 may be a contact of the ID chip 302.

The plurality of contacts 320A-320H of the ID chip 302 may extend along the first main side 306 of the body 304. In other embodiments, the ID chip 302 may be formed along the second main side of the card 300. Although non-limiting, the ID chip 302 may include six contacts (320A-320F) or eight contacts (320A-320H) in various embodiments. It will be appreciated that the plurality of contacts are electrically isolated from one another. As shown, a first contact 320A of the plurality of contacts may extend entirely to the first end perimeter 313, while a second contact 320B of the plurality of contacts may extend between the first contact 320A and the plate 322. In some embodiments, the second contact 320B is electrically separated from the first contact 320A by a first non-conductive border or liner 324, which may extend between the second side perimeter 312 and the plate 322. An interior border 347 of the plate 322 may electrically insulate the first and second contacts 320A, 320B from the plate 322. As further shown, a third contact 320C may extend between the first non-conductive liner 324 and the interior border 347 of the plate 322, while fifth and sixth contacts 320E, 320F may only extend between the first end perimeter 313 and the first non-conductive border or liner 324. When present, seventh contact 320G may extend to the second side perimeter 312, while eighth contact 320H may extend to both the first end perimeter 313 and the second side perimeter 312. As shown, the seventh contact 320G may be defined in part by the interior border 347 of the plate 322.

Although non-limiting, contacts 320A-320F may be generally present within quadrants I. and II. In some embodiments, all of the contacts 320 of the ID chip 302 may be present within quadrant I. Furthermore, the second, third, and fourth contacts 320B, 320C, 320D may be positioned a first predefined distance from the first end perimeter 313 and a second predefined distance from the first side perimeter 311 to enable the ID chip 302 of the card 300 to operate normally with existing chip reading devices. However, by extending certain of the plurality of contacts 320A-320H to one or more edges defining the outer perimeter 308, the card 300 may also be read by non-conventional chip readers.

Figure 4:
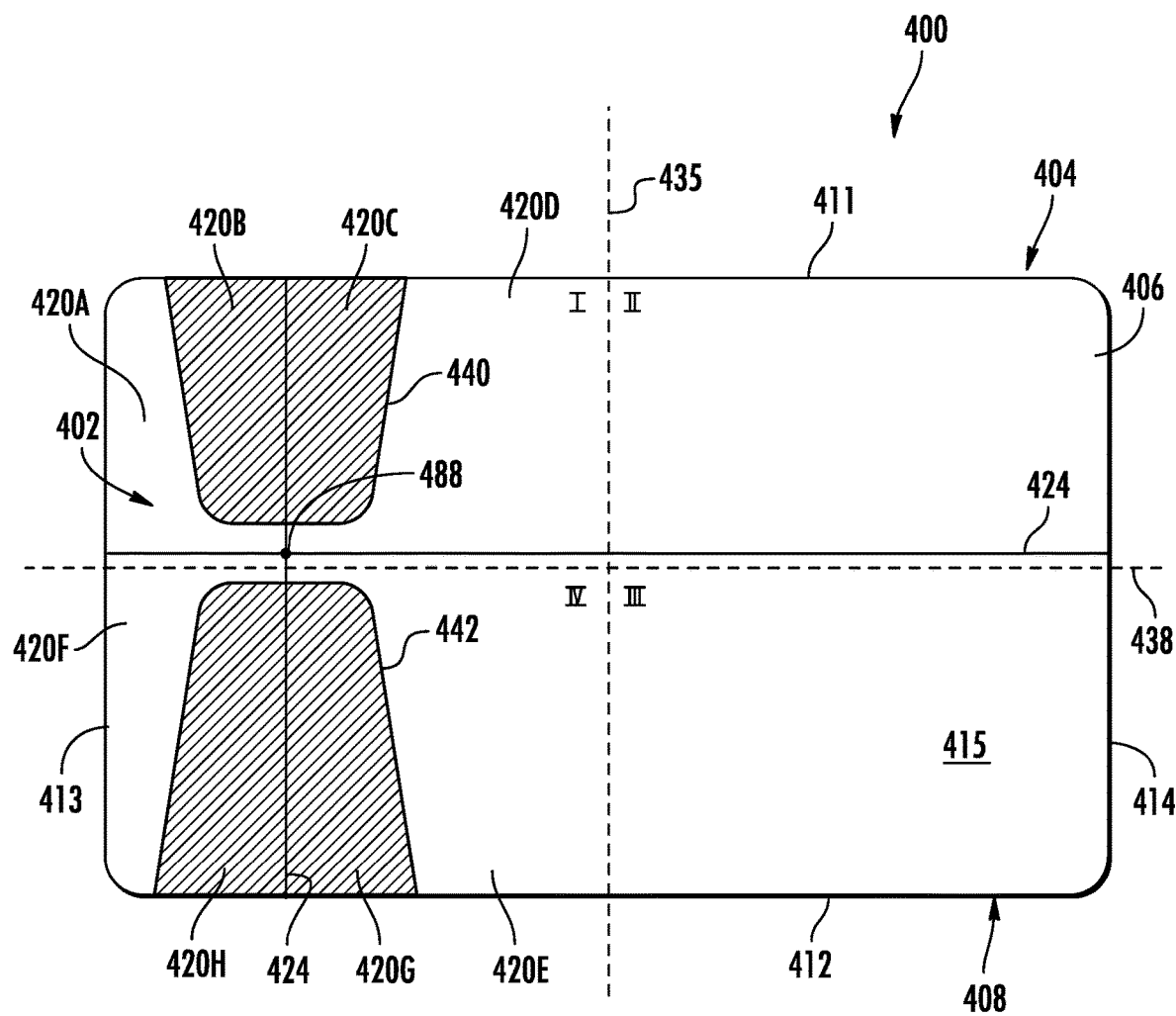
FIG. 4 is a top view of a transaction card in accordance with embodiments of the present disclosure.

Referring now to FIG. 4, an example transaction card (hereinafter "card") 400 according to embodiments of the disclosure will be described. In the card 400 shown, an outer layer 415 of a body 404 of the card 400 may be made from one or more layers of metal. The body 404 of the card 400 may include a first main side 406 opposite a second main side. Although non-limiting, the first main side 406 may correspond to a front or top side of the card 400, while the second main side may correspond to a back or bottom side of the card 400. The body 404 may be defined by an outer perimeter 408 including a first side perimeter 411 opposite a second side perimeter 412, and a first end perimeter 413 opposite a second end perimeter 414. The first end perimeter 413 may correspond to an insertion end of the card 400. In other embodiments, the second end perimeter 414 may be the insertion end of the card 400. The body 404 may include four quadrants (I-IV) defined by a first axis 435 and a second axis 438.

An ID chip 402 of the card 400 may include a plurality of contacts 420A-420H along the first main side 406 of the body 404. In other embodiments, the ID chip 402 may be formed along the second main side of the card 400. Although non-limiting, the ID chip 402 may include six contacts (420A-420F) or eight contacts (420A-420H) in various embodiments. It will be appreciated that the plurality of contacts 420A-420H are electrically isolated from one another by one or more insulative sections or borders 424. As shown, a first contact 420A of the plurality of contacts may extend to the first end perimeter 413 and to the first side perimeter 411, while a second contact 420B, a third contact 420C, and a fourth contact 420D may extend to the first side perimeter 411. A fifth contact 420E may extend to the second side perimeter 412, while a sixth contact 420F may extend to the first end perimeter 413. When present, a seventh contact 420G and an eighth contact 420H may extend to the second side perimeter 412. In some embodiments, second and third contacts 420B, 420 and seventh and eight contacts 420G, 420H may be made from a first material, while the remaining contacts may be made from a second, different material. Embodiments herein are not limited in this context.

Although non-limiting, contacts 420A-420F may be generally present within quadrant I. As shown, contacts 420E-420F may be present within quadrant IV. It will be appreciated that, an intersection 488 of contacts 420A-420F may be located a first predefined distance from the first end perimeter 413 and a second predefined distance from the first side perimeter 411 to enable the ID chip 402 of the card 400 to operate normally with existing chip reading devices. However, by extending certain of the contacts to one or more edges defining the outer perimeter 408, the card 400 may also be read by non-conventional chip readers. As shown, a border 442 of the seventh and eighth contacts 420G, 420H may extend closer to the second axis 438 than a border 440 of the second and third contacts 420B, 420.

Figure 5:
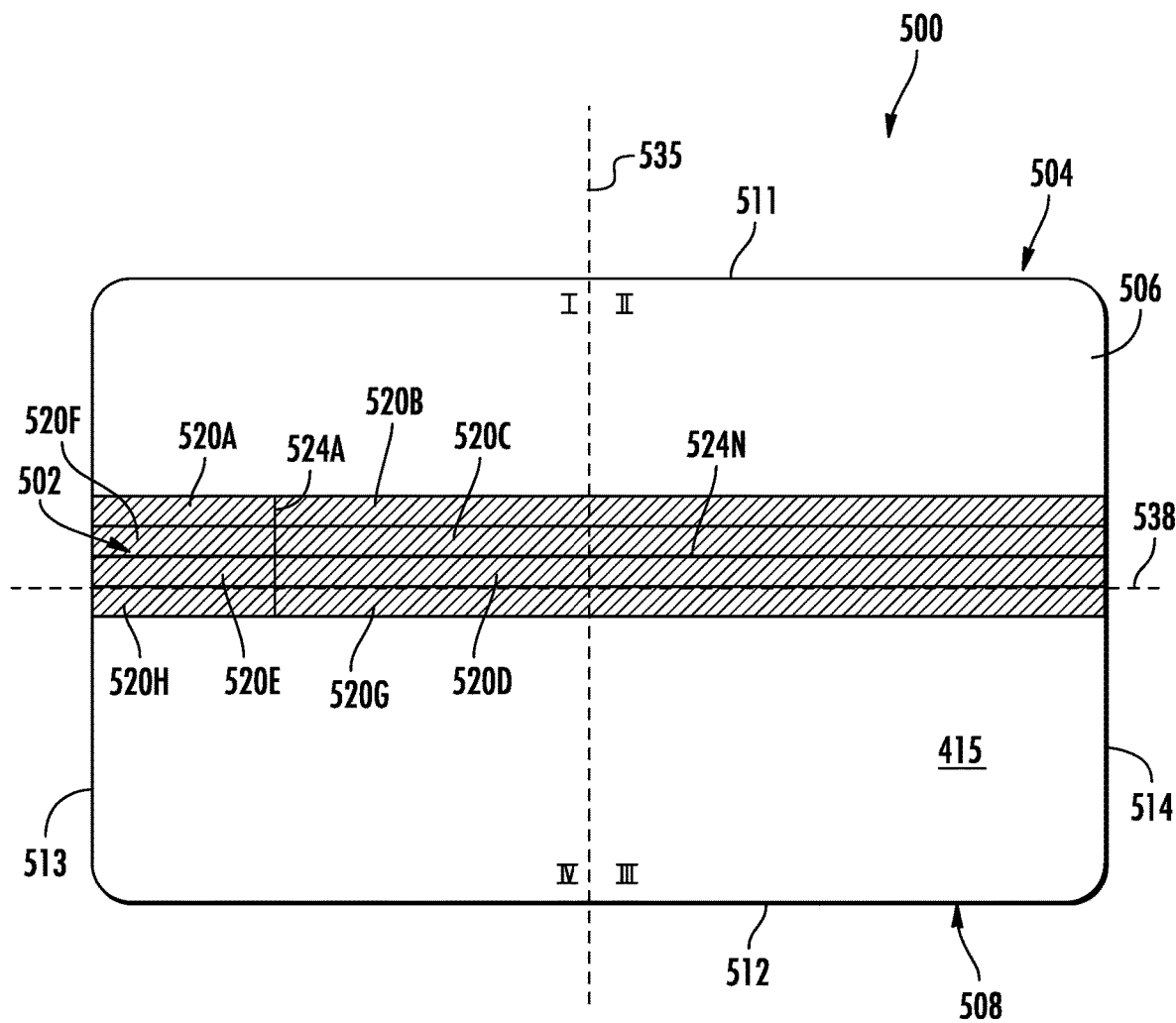
FIG. 5 is a top view of a transaction card in accordance with embodiments of the present disclosure.

Referring now to FIG. 5, an example transaction card (hereinafter "card") 500 according to embodiments of the disclosure will be described. In the card 500 shown, an outer layer 515 of a body 504 of the card 500 may be made from one or more layers of metal. The body 504 of the card 500 may include a first main side 506 opposite a second main side. The body 504 may be defined by an outer perimeter 508 including a first side perimeter 511 opposite a second side perimeter 512, and a first end perimeter 513 opposite a second end perimeter 514. The first end perimeter 513 may correspond to an insertion end of the card 500. The body 504 may include four quadrants (I-IV) defined by a first axis 535 and a second axis 538.

An ID chip 502 of the card 500 may include a plurality of contacts 520A-520H along the first main side 506 of the body 504. In other embodiments, the ID chip 502 may be formed along the second main side of the card 500. Although non-limiting, the ID chip 502 may include six contacts (520A-520F) or eight contacts (520A-520H) in various embodiments. It will be appreciated that the plurality of contacts are electrically isolated from one another by one or more insulative sections or borders 524A-524N. As shown, a first contact 520A of the plurality of contacts may extend to the first end perimeter 513, while a second contact 520B, a third contact 520C, and a fourth contact 520D may extend to the second end perimeter 514. A fifth contact 520E and a sixth contact 520F may extend to the first end perimeter 513. When present, a seventh contact 520G may extend to the second end perimeter 514 and an eighth contact 520H may extend to the first end perimeter 513. As shown, contacts 520B-520D and 520G may extend across the first axis 535. In some embodiments, the plurality of contacts 520A-520H may be made from a first material, while the remainder of the card 500 may be made from a second, different material. Embodiments herein are not limited in this context.

Although non-limiting, contacts 520A-520F may be generally present within quadrant I, while contacts 520G and 520H may be present within quadrant IV. It will be appreciated that, an intersection of contacts 520A-520F along insulative border 524A may be located a first predefined distance from the first end perimeter 513 and a second predefined distance from the first side perimeter 511 to enable the ID chip 502 of the card 500 to operate normally with existing chip reading devices. However, by extending certain of the plurality of contacts 520A-520H to one or more edges defining the outer perimeter 508, the card 500 may also be read by non-conventional chip readers.

Figure 6:
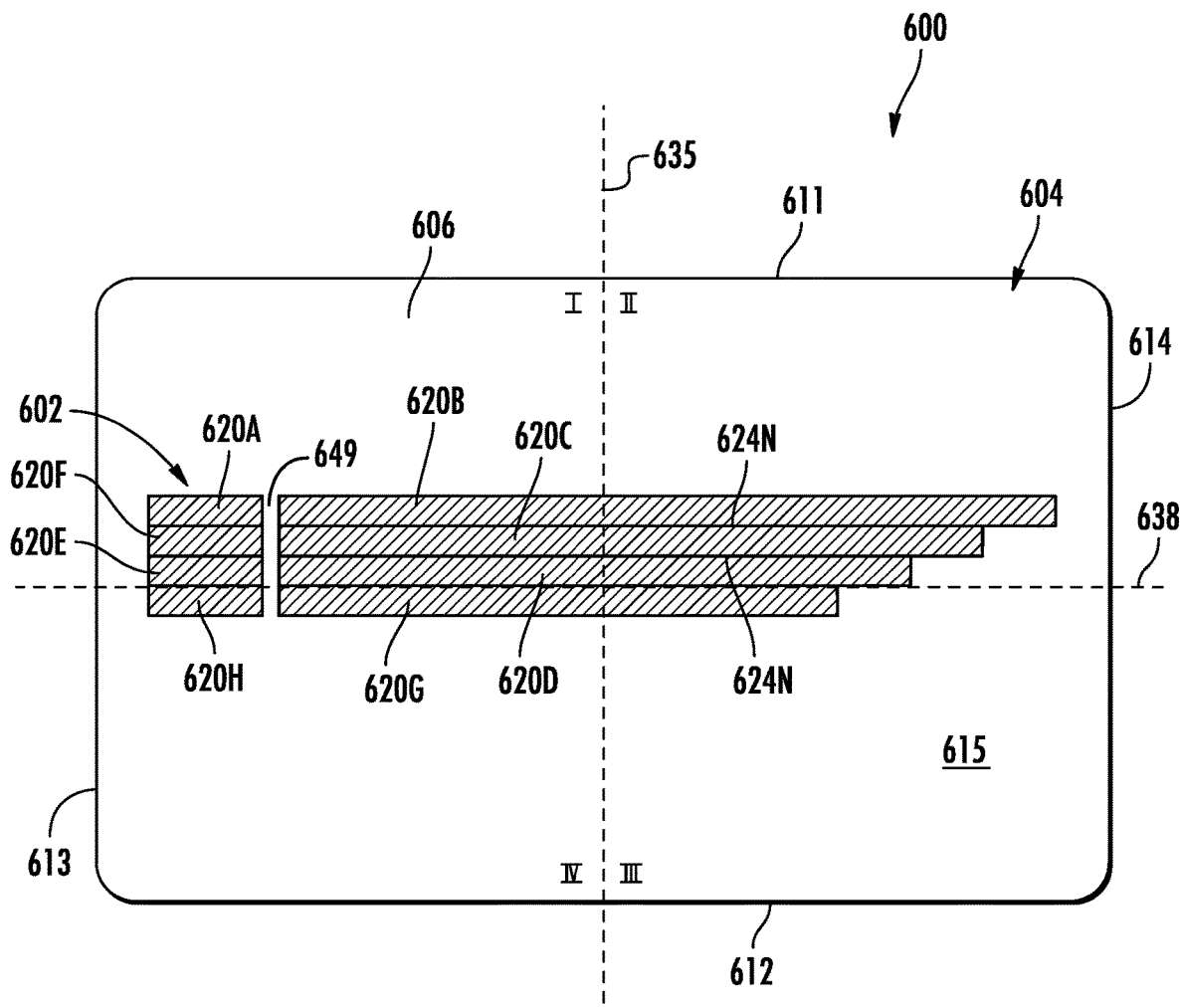
FIG. 6 is a top view of a transaction card in accordance with embodiments of the present disclosure.

Referring now to FIG. 6, an example transaction card (hereinafter "card") 600 according to embodiments of the disclosure will be described. In the card 600 shown, an outer layer 615 of a body 604 of the card 600 may be made from one or more layers of metal. The body 604 may be defined by a first side perimeter 611 opposite a second side perimeter 612, and a first end perimeter 613 opposite a second end perimeter 614. The first end perimeter 613 may correspond to an insertion end of the card 600. The body 604 may include four quadrants (I-IV) defined by a first axis 635 and a second axis 638.

An ID chip 602 of the card 600 may include a plurality of contacts 620A-620H along a first main side 606 of the body 604. Although non-limiting, the ID chip 602 may include six contacts (620A-620F) or eight contacts (620A-620H) in various embodiments. It will be appreciated that the plurality of contacts are electrically isolated from one another by one or more insulative sections or borders 624A-624N. In this embodiment, certain of the contacts may be separated from one another by a gap 649, wherein the gap 649 may include a portion of the body 604 of the card 600.

Contacts 620A-620F may be generally present within quadrant I, while contacts 620G and 620H may be present within quadrant IV. As shown, contacts 620B-620D and 620G of the plurality of contacts may also extend across the first axis 635 into quadrant II. It will be appreciated that at least a portion of contacts 620A-620F may be located a first predefined distance from the first end perimeter 613 and a second predefined distance from the first side perimeter 611 to enable the ID chip 602 of the card 600 to operate normally with existing chip reading devices.

Figure 7:
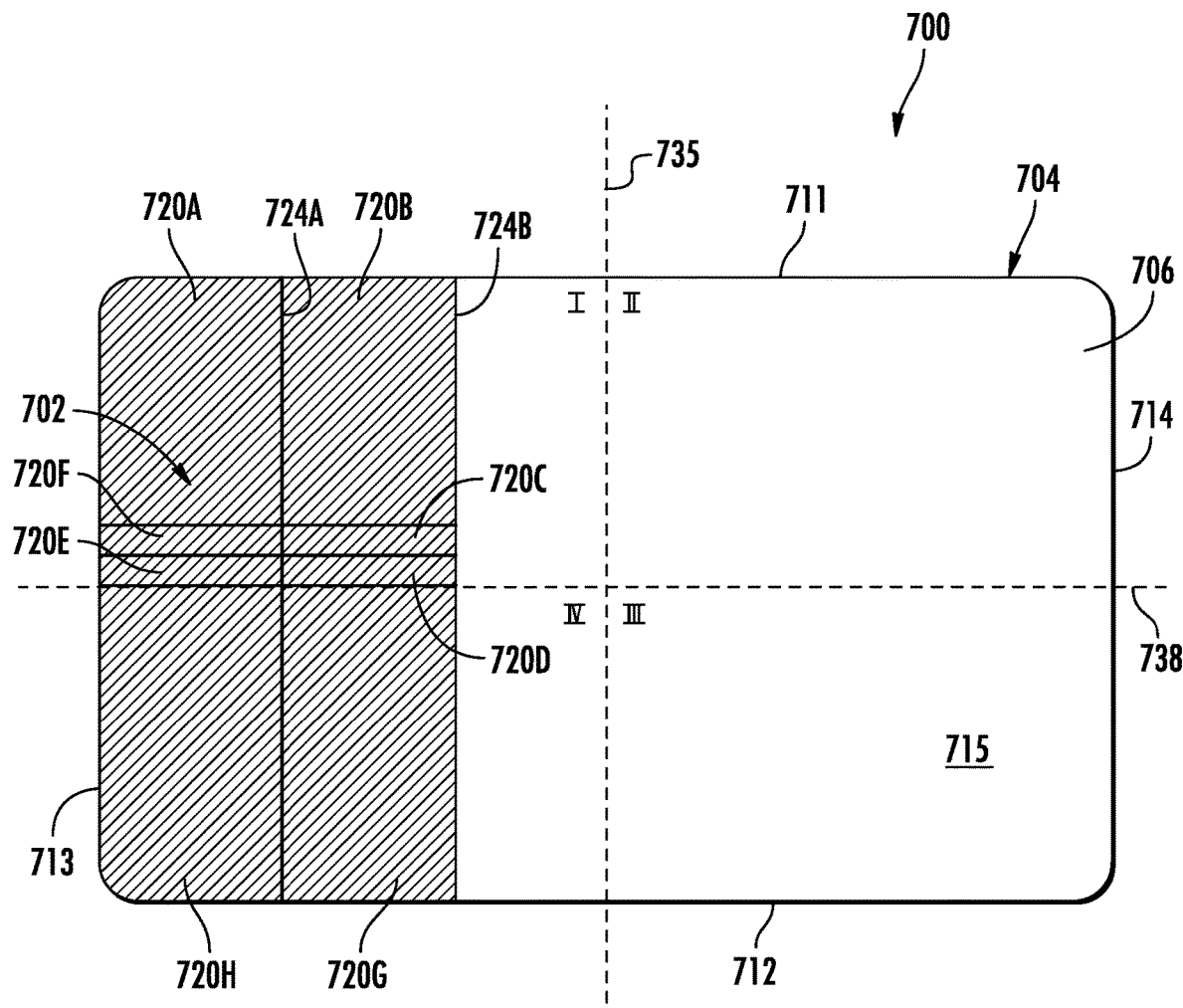
FIG. 7 is a top view of a transaction card in accordance with embodiments of the present disclosure.

Referring now to FIG. 7, an example card 700 according to embodiments of the disclosure will be described. In the card 700 shown, an outer layer 715 of a body 704 of the card 700 may be made from one or more layers of metal. The body 704 may be defined by a first side perimeter 711 opposite a second side perimeter 712, and a first end perimeter 713 opposite a second end perimeter 714. The first end perimeter 713 may correspond to an insertion end of the card 700. The body 704 may include four quadrants (I-IV) defined by a first axis 735 and a second axis 738.

An ID chip 702 of the card 700 may include a plurality of contacts 720A-720H along a first main side 706 of the body 704. Although non-limiting, the ID chip 702 may include six contacts (720A-720F) or eight contacts (720A-720H) in various embodiments. It will be appreciated that the plurality of contacts 720A-720H are electrically isolated from one another by one or more insulative sections or borders 724A-724N.

Contacts 720A-720F may be generally present within quadrant I, while contacts 720G and 720H may be present within quadrant IV. As shown, a first contact 720A may extend to the first end perimeter 713 and to the first side perimeter 711, while a second contact 720B may extend to the first side perimeter 711. A third contact 720C and a fourth contact 720D may extend between insulative borders 724A and 724B. A fifth contact 720E and a sixth contact 720F may extend to the first end perimeter 713, a seventh contact 720G may extend to the second side perimeter 712, and an eighth contact 720H may extend to the second side perimeter 712 and to the first end perimeter 713. It will be appreciated that, an intersection along insulative border 724A of contacts 720A-720F may be located a first predefined distance from the first end perimeter 713 and a second predefined distance from the first side perimeter 711 to enable the ID chip 702 of the card 700 to operate normally with existing chip reading devices. However, by extending certain of the contacts to one or more edges defining the outer perimeter 708, the card 700 may also be read by non-conventional chip readers.

Figure 8:
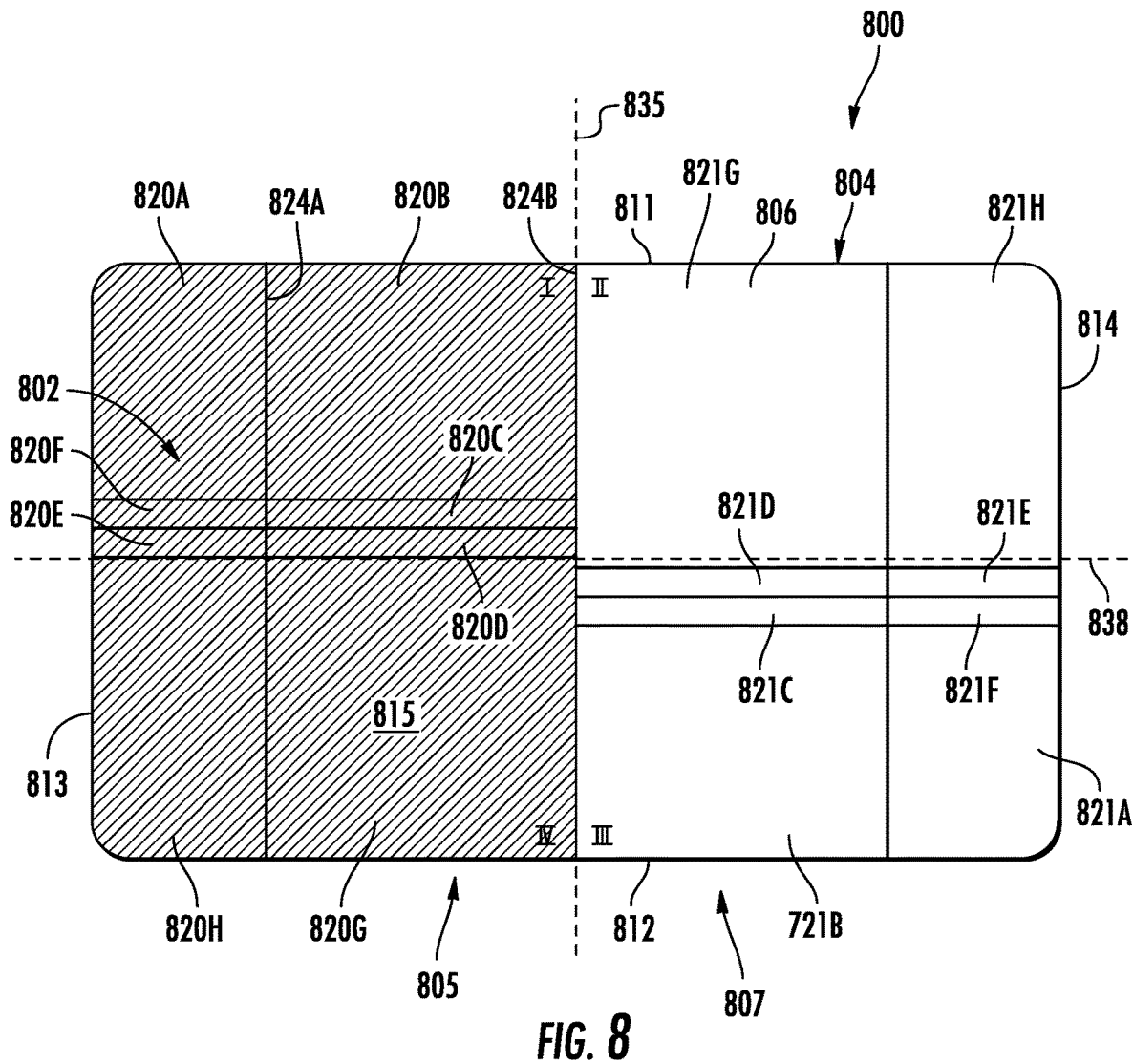
FIG. 8 is a top view of a transaction card in accordance with embodiments of the present disclosure.

Referring now to FIG. 8, an example card 800 according to embodiments of the disclosure will be described. In the card 800 shown, an outer layer 815 of a body 804 of the card 800 may be made from one or more layers of metal. The body 804 may be defined by a first side perimeter 811 opposite a second side perimeter 812, and a first end perimeter 813 opposite a second end perimeter 814. The first end perimeter 813 may correspond to a first insertion end of the card 800, while the second end perimeter 814 may correspond to a second insertion end of the card 800. The body 804 may include four quadrants (I-IV) defined by a first axis 835 and a second axis 838. In this embodiment, the card 800 may include a first ID chip 802A and a second ID chip 802B, effectively making the card 800 a dual card including two separate halves 805 and 807.

As shown, the first ID chip 802A may include a first plurality of contacts 820A-820H along a first main side 806 of the body 804. Although non-limiting, the first ID chip 802A may include six contacts (820A-820F) or eight contacts (820A-820H) in various embodiments. The second ID chip 802B may include a second plurality of contacts 821A-821H along the first main side 806 of the body 804. Although non-limiting, the second ID chip 802B may include six contacts (821A-821F) or eight contacts (821A-821H) in various embodiments. It will be appreciated that the contacts of the first and second ID chips 802A, 802B are electrically isolated from one another by one or more insulative sections or borders.

Contacts 820A-820F may be generally present within quadrant I, while contacts 820G and 820H may be present within quadrant IV. Contacts 821A-821F may be generally present within quadrant III, while contacts 821G and 821H may be present within quadrant II. As shown, a first contact 820A of the first ID chip 802A may extend to the first end perimeter 813 and to the first side perimeter 811, while a second contact 820B may extend to the first side perimeter 811. A third contact 820C and a fourth contact 820D may extend between insulative borders 824A and 824B. A fifth contact 820E and a sixth contact 820F may extend to the first end perimeter 813, a seventh contact 820G may extend to the second side perimeter 812, and an eighth contact 820H may extend to the second side perimeter 812 and to the first end perimeter 813. A first contact 821A of the second ID chip 802B may extend to the second end perimeter 813 and to the second side perimeter 812, while a second contact 821B may extend to the second side perimeter 812. A third contact 821C and a fourth contact 821D may extend between insulative borders 824B and 824C. A fifth contact 821E and a sixth contact 821F may extend to the second end perimeter 814, a seventh contact 821G may extend to the first side perimeter 811, and an eighth contact 821H may extend to the first side perimeter 811 and to the second end perimeter 814.

It will be appreciated that, an intersection along insulative border 824A of contacts 820A-820F may be located a first predefined distance from the first end perimeter 813 and a second predefined distance from the first side perimeter 711 to enable the first ID chip 802A to operate normally with existing chip reading devices. Similarly, an intersection along insulative border 824C of contacts 821A-821F may be located a first predefined distance from the second end perimeter 814 and a second predefined distance from the second side perimeter 812 to enable the second ID chip 802B to operate normally with existing chip reading devices. In some embodiments, the second ID chip 802B may be located along a second main side of the card 800, opposite the first main side 806.

Figure 9:
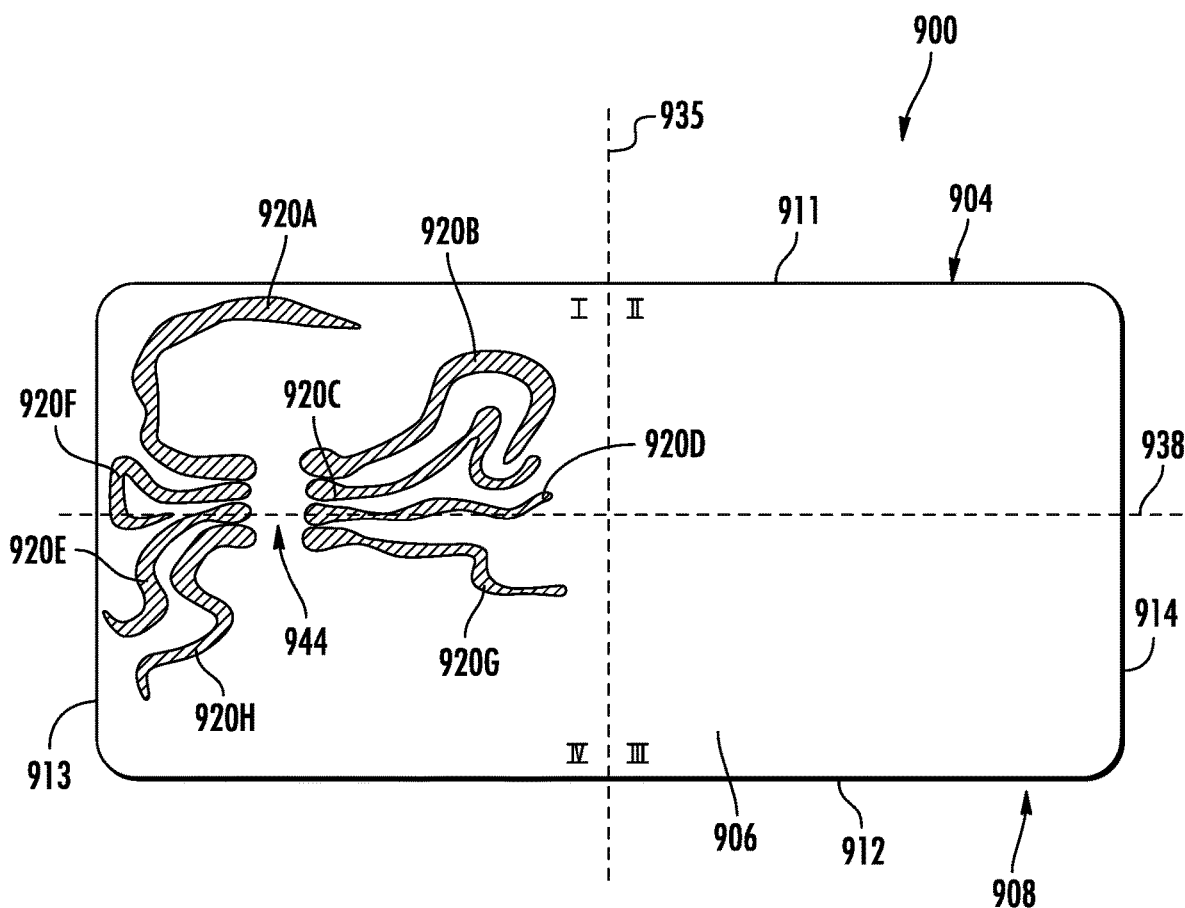
FIG. 9 is a top view of a transaction card in accordance with embodiments of the present disclosure.

Referring now to FIG. 9, an example card 900 according to embodiments of the disclosure will be described. In the card 900 shown, a body 904 may be defined by a first side perimeter 911 opposite a second side perimeter 912, and a first end perimeter 913 opposite a second end perimeter 914. The first end perimeter 913 may correspond to an insertion end of the card 900. The body 904 may include four quadrants (I-IV) defined by a first axis 935 and a second axis 938.

An ID chip 902 of the card 900 may include a plurality of contacts 920A-920H along a first main side 906 of the body 904. Although non-limiting, the ID chip 902 may include six contacts (920A-920F) or eight contacts (920A-920H) in various embodiments. It will be appreciated that the plurality of contacts are electrically isolated from one another by one or more insulative sections 924 of the body 904 of the card 900.

In this embodiment, one or more of the plurality of contacts 920A-920H may be curvilinear. As shown, contacts 920A-920F may be generally present within quadrant I, while contacts 920G and 920H may be present within quadrant IV. As shown, contacts 920D-920D and 920E of the plurality of contacts may also extend across the second axis 938. It will be appreciated that at least an interior end of each of the contacts 920A-920F may terminate in a contact area 944 of the card 900. The contact area 944 may be located a first predefined distance from the first end perimeter 913 and a second predefined distance from the first side perimeter 911 to enable the ID chip 902 of the card 900 to operate normally with existing chip reading devices. However, by extending certain of the contacts (e.g., contacts 920A and 920E) to one or more edges defining the outer perimeter 908, the card 900 may also be read by non-conventional chip readers.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Although non-limiting, the cards described herein may have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A transaction card, comprising:
a body comprising a first main side opposite a second main side, wherein the body defines an outermost perimeter including a first end perimeter opposite a second end perimeter, and a first side perimeter opposite a second side perimeter;
a metal plate along the first main side; and
an identification chip comprising a plurality of contacts, wherein a first contact of the plurality of contacts extends to the first end perimeter and the metal plate, a second contact of the plurality of contacts extends to the metal plate and to the first contact, a third contact extends to the first end perimeter and the first contact, and a fourth contact extends from the third contact to the metal plate and extends to the second contact, and wherein the plurality of contacts are separated by non-conductive areas of the first main side.

2. The transaction card of claim 1, wherein the first main side comprises an outer layer, and wherein the identification chip is part of the outer layer.

3. The transaction card of claim 2, further comprising a magnetic stripe extending along the second main side of the body.

4. The transaction card of claim 2, wherein the outer layer is a metallic layer.

5. The transaction card of claim 4, wherein the metal plate is part of the metallic layer.

6. The transaction card of claim 1, wherein the metal plate extends between the first end perimeter and the second side perimeter.

7. The transaction card of claim 1, wherein the non-conductive areas comprise a gap between a first edge of the first contact of the plurality of contacts and a second edge of the second contact of the plurality of contacts.

8. The transaction card of claim 1, wherein the metal plate is one of the plurality of contacts of the identification chip.

9. The transaction card of claim 1, further comprising a second identification chip along the first main side, wherein the second identification chip comprises a second plurality of contacts, wherein at least one contact of the second plurality of contacts extends to at least one of the following: the first end perimeter, the second end perimeter, the first side perimeter, and the second side perimeter.

10. A transaction card, comprising:
a body that defines an outermost perimeter including a first end perimeter opposite a second end perimeter, and a first side perimeter opposite a second side perimeter;
a metal plate embedded in the body; and
an identification chip comprising a plurality of contacts, wherein a first contact of the plurality of contacts extends to the first end perimeter and the metal plate, a second contact of the plurality of contacts extends to the metal plate and to the first contact, a third contact extends to the first end perimeter and the first contact, and a fourth contact extends from the third contact to the metal plate and extends to the second contact, and wherein the plurality of contacts are separated by non-conductive areas.

11. The transaction card of claim 10, wherein the body comprises an outer layer, and wherein the identification chip is part of the outer layer.

12. The transaction card of claim 11, further comprising a magnetic stripe extending along the body.

13. The transaction card of claim 11, wherein the outer layer is a metallic layer.

14. The transaction card of claim 13, wherein the metal plate is part of the metallic layer.

15. The transaction card of claim 10, wherein the metal plate extends between the first end perimeter and the second side perimeter.

16. The transaction card of claim 10, wherein the non-conductive areas comprise a gap between a first edge of the first contact of the plurality of contacts and a second edge of the second contact of the plurality of contacts.

17. The transaction card of claim 10, wherein the metal plate is one of the plurality of contacts of the identification chip.

18. The transaction card of claim 10, wherein the non-conductive areas comprise a liner that extends between the first side perimeter and the second side perimeter.

19. The transaction card of claim 18, wherein the non-conductive areas comprise a second liner that extends between the first end perimeter and the second end perimeter.

20. The transaction card of claim 10, further comprising a second identification chip, wherein the second identification chip comprises a second plurality of contacts, wherein at least one contact of the second plurality of contacts extends to at least one of the following: the first end perimeter, the second end perimeter, the first side perimeter, and the second side perimeter.

* * * * *